(No Model.)
J. B. JOHNSON.
SUBSOIL HOE.
No. 406,737. Patented July 9, 1889.
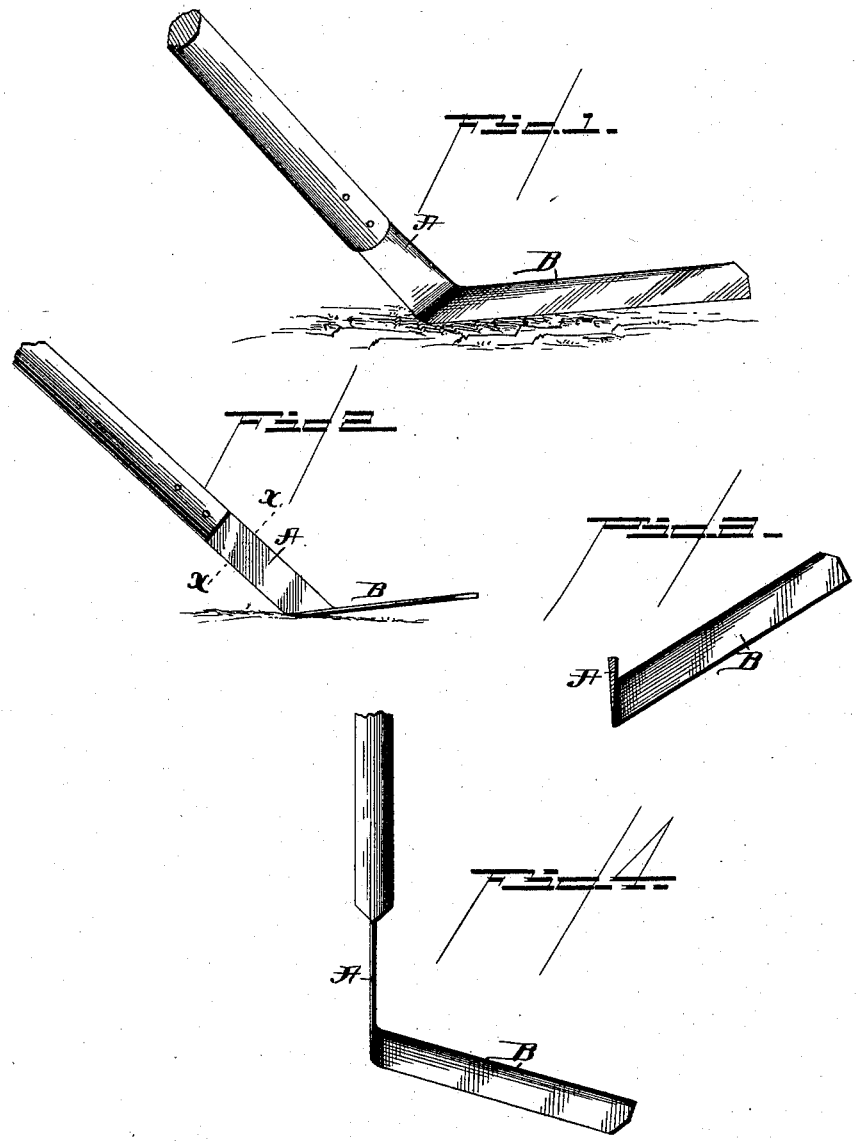

UNITED STATES PATENT OFFICE.

JOHN B. JOHNSON, OF NEWTON, ILLINOIS.

SUBSOIL-HOE.

SPECIFICATION forming part of Letters Patent No. 406,737, dated July 9, 1889.

Application filed August 14, 1888. Serial No. 282,715. (No model.)

*To all whom it may concern:*

Be it known that I, JOHN B. JOHNSON, a citizen of the United States, residing at Newton, in the county of Jasper and State of Illinois, have invented certain new and useful Improvements in Subsoil-Hoes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a subsoil-hoe, and has for its object the providing of a hoe that will be simple, cheap, and efficient, and which will stir or loosen the earth to any desired depth without removing it with comparative ease and rapidity, and which at the same time can be used for removing weeds, grass, &c., around the plants.

The hoe is composed of a colter, which is in line with the handle, and a blade or share projecting rearwardly from the colter, the two being made, preferably, of a single blank. The lower edge of both the colter and the blade or share is sharpened, and the blade itself inclines upwardly in the direction of its width from its lower to its upper edge.

The improvement consists of the details of construction and the peculiar combination of the parts, which hereinafter will be more fully described and claimed, and shown in the drawings, in which—

Figure 1 is a perspective view of a subsoil-hoe of my invention; Fig. 2, a side view of the hoe; Fig. 3, a front sectional view of the hoe on the line *xx* of Fig. 2; Fig. 4, a bottom plan view of the hoe.

The subsoil-hoe is composed of the colter A and the blade or share B, which projects laterally from the colter in a rearwardly direction, the blade inclining upwardly from its lower to its upper edge in the direction of its width. The colter and the blade are integral and for the purposes of economy and lightness of construction they are formed from a strip of sheet metal, steel being preferable, which is bent between its ends on an oblique line. I do not desire to restrict myself to this form of construction, as other forms may be desired. For instance, the colter and the blade may be separate pieces and welded together, or the hoe may be cast in the form shown. The handle has a kerf in its lower end to receive the upper end of the colter, which is fitted in the kerf and secured therein by rivets or other fastening devices.

In practice the handle is held in the ordinary position for hoeing and the colter in a vertical plane. In this position the blade inclines rearwardly and upwardly. By pressing down on the hoe and drawing it forward the colter and blade will cut into the ground and the share or blade will cut under and loosen the earth, which rides over the blade and falls back into the furrow or cut made by the said share or blade. Thus it will be seen that the earth is not disturbed or removed, but simply loosened.

Having thus described my invention, what I claim, and desire to secure by Letters Patent, is—

As an improved article of manufacture, the hereinbefore-described subsoil-hoe, composed of a handle having a kerf in its lower end, and the blade composed of a thin strip of spring-steel of uniform thickness and of a width corresponding with the diameter of the handle bent between its ends on an oblique line and having one edge beveled to an edge, one end of the blade being inserted in said kerf and held therein by rivets, substantially as specified.

In testimony whereof I affix my signature in presence of two witnesses.

JOHN B. JOHNSON.

Witnesses:
BENJ. F. JONES,
WM. H. WILSON.